United States Patent
Johnson et al.

(10) Patent No.: US 6,507,289 B1
(45) Date of Patent: Jan. 14, 2003

(54) APPARATUS AND METHOD OF CHECKING RADIO ALTITUDE REASONABLENESS

(75) Inventors: Steven C. Johnson, Issaquah, WA (US); Glen A. Burlingame, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/680,557

(22) Filed: Oct. 5, 2000

Related U.S. Application Data (60) Provisional application No. 60/157,901, filed on Oct. 5, 1999.

(51) Int. Cl.$^7$ ................................................ G08B 23/00
(52) U.S. Cl. .......................................... 340/970; 701/4
(58) Field of Search ................................ 340/970, 961, 340/963, 977; 342/65; 701/4, 5, 9, 14

(56) References Cited

U.S. PATENT DOCUMENTS

| | | | |
|---|---|---|---|
| 3,936,797 A | * | 2/1976 | Andresen, Jr. |
| 4,431,994 A | | 2/1984 | Gemin ........................ 340/970 |
| 4,567,483 A | * | 1/1986 | Bateman et al. ............. 340/970 |
| 4,675,823 A | | 6/1987 | Noland ........................ 340/970 |
| 4,922,258 A | * | 5/1990 | Hassenpflug ................. 342/462 |
| 5,109,230 A | | 4/1992 | Hassenpflug ................. 342/117 |
| 5,410,317 A | | 4/1995 | Ostrom et al. ................. 342/65 |
| 5,638,282 A | * | 6/1997 | Chazelle et al. ............. 340/970 |
| 5,892,462 A | | 4/1999 | Tran ........................... 340/961 |
| 6,216,064 B1 | * | 4/2001 | Johnson et al. ................. 701/4 |

FOREIGN PATENT DOCUMENTS

EP            0 928 952 a1            1/1999

* cited by examiner

*Primary Examiner*—Brent A. Swarthout (57) ABSTRACT

In a ground proximity warning system for an aircraft, a signal representing clearance of the aircraft from the underlying terrain is produced from a sea level related altitude signal and a terrain database in addition to the radio altitude signal of the aircraft's radio altimeter. An indication of reasonableness of the aircraft radio altitude signal is formed jointly responsive to the aircraft radio altitude signal and the terrain clearance signal.

36 Claims, 6 Drawing Sheets

| 401-1 | 401-2 | 401-3 |
|---|---|---|
| 400 | 300 | 100 |
| 401-4 | 401-5 | 401-6 |
| 300 | 200 | 200 |
| 401-7 | 401-8 | 401-9 |
| 400 | 100 | 200 |

| 410 | 420 | 425 |
|---|---|---|
| VALIDITY FLAG | TERRAIN LOCATION | TERRAIN HEIGHT |

APPARATUS AND METHOD OF CHECKING RADIO ALTITUDE REASONABLENESS

This application claims priority under 35 U.S.C. § 119(e) to U.S. provisional application Ser. No. 60/157,901 filed Oct. 5, 1999 that is incorporated herein by reference in its entirety.

FIELD OF THE INVENTION

This invention relates to aircraft warning systems and more particularly to arrangements for determining the conditions to inhibit false warnings of a ground proximity warning system.

BACKGROUND OF THE INVENTION

An aircraft generally uses a ground proximity warning system (GPWS) to alert its flight crew to conditions that could result in aircraft crashes due to the position of the aircraft with respect to the terrain along its flight path. GPWS is designed to generate warnings if an aircraft enters a flight path to the ground that could lead to a potentially dangerous situation. Such hazardous conditions could result from an excessive descent rate, an excessive terrain closure rate, loss of altitude after takeoff, insufficient terrain clearance when not in a landing configuration or descent below the instrument landing system (ILS) glide-slope. The GPWS uses inputs from systems that provide indications of radio altitude, aircraft position, airspeed/Mach number, landing gear and flap position and decision height (DH) setting. In situations where an aircraft is deemed too close to the ground, the GPWS system issues an audible and/or visual alarm. In response, the flight crew immediately changes the flight path of the aircraft to avoid a potential crash.

The GPWS system usually relies on a radio altimeter using radar to track the position of the aircraft with respect to the ground. The radio altimeter determines the altitude of the aircraft by reflecting radio waves from the ground. There are, however, numerous reported GPWS nuisance alarms caused by false radio altimeter tracking. The rapid upward pitching of the aircraft when the flight crew responds to a nuisance alarm results in avoidable passenger and flight attendant discomfort.

When the aircraft is not in a landing configuration, a warning issued for insufficient terrain clearance may be generated if there is false radio altimeter tracking. Such false tracking can occur, for example, when the aircraft is flying through severe rain and/or hail conditions or when the aircraft is overflying another aircraft. The returns from the aircraft radio altimeter system can reflect the position of the rain and/or hail condition or the underlying aircraft and falsely indicate that the aircraft is too close to the ground so that a GPWS warning is issued.

Figure 1:
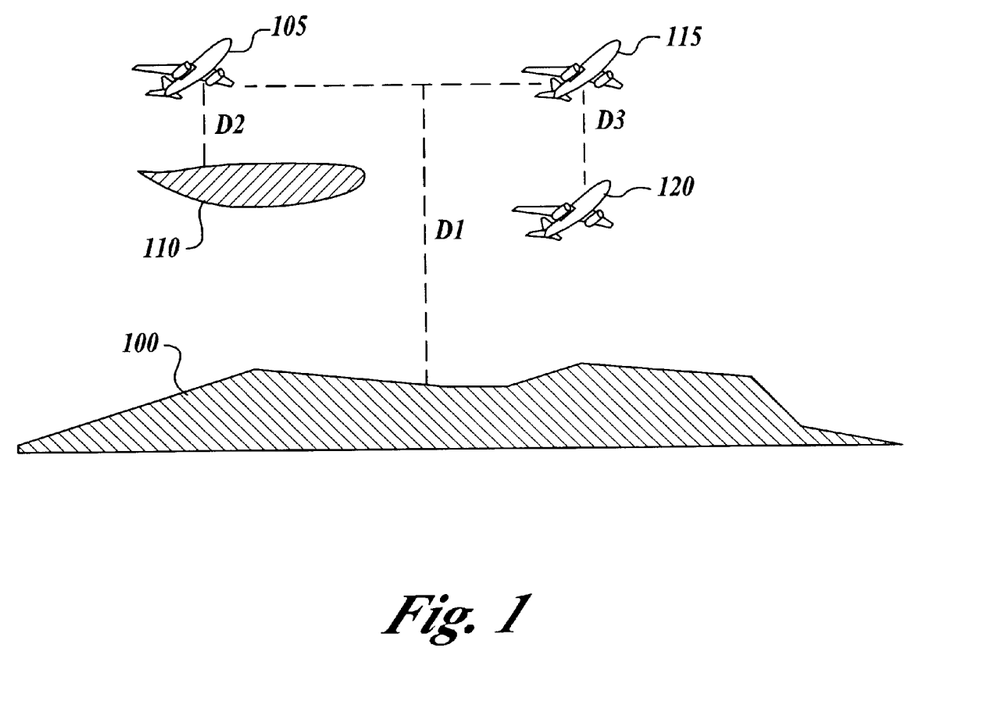
FIG. 1 illustrates altitude measurements obtained by the radio altimeter of an aircraft.

FIG. 1 illustrates two conditions under which a radio altimeter may return false indications of altitude. In FIG. 1, an aircraft 105 is at a safe height D1 over the terrain 100 but is flying above an area 110 exhibiting heavy clouds, severe rain and/or hail. Radio altimeter signals are returned to the aircraft 105 that indicate a distance D2 from a severe cloud condition 110. The indication of the aircraft radio altimeter of the D2 height of aircraft 105 above the condition 110 may trigger a GPWS warning. Aircraft 115 in FIG. 1 is also at a safe height D1 over the terrain 100 but is passing over another aircraft 120. Its radio altimeter returns signals indicating a height D3 over the terrain 100 due to the presence of the aircraft 120 and the false indication may trigger a warning from the GPWS system in aircraft 115. In these situations, the aircraft crew must respond by changing aircraft flight path to avoid an apparent hazard. Such false indications of an aircraft's radio altimeter present a serious problem to safe and comfortable aircraft flight.

BRIEF SUMMARY OF THE INVENTION

The invention is directed to inhibiting false ground proximity warnings of an aircraft resulting from misleading aircraft radio altimeter indications. According to the invention, a radio altitude signal for the aircraft and a separately determined signal representing the clearance of the aircraft from the underlying terrain are generated. In response to the radio altimeter altitude signal and the terrain clearance signal, an indication of the reasonableness state of the radio altitude signal is issued.

According to one aspect of the invention, an indication of an unreasonable state of the radio altimeter signal is issued in response to a comparison of the terrain clearance signal and the radio altitude signal.

According to another aspect of the invention, an indication of an unreasonable state of the radio altimeter signal is issued in response to the terrain clearance signal less the radio altitude signal being larger than a preset value.

According to another aspect of the invention, issuance of a radio altitude unreasonableness state indication is inhibited when the separately determined terrain clearance signal is less than a predetermined value.

According to yet another aspect of the invention, the terrain clearance signal is formed by generating a signal representative of the geometric altitude of the aircraft, generating a signal representative of the height of the terrain underlying the aircraft and producing a signal corresponding to the difference between the geometric altitude and the terrain height.

According to yet another aspect of the invention, the terrain height signal is generated from a terrain database that includes signals representative of the maximum heights of sections of the terrain under the flight path of the aircraft.

According to yet another aspect of the invention, the geometric altitude signal corresponds to the altitude of the aircraft relative to sea level and is generated from Global Positioning System signals received by the aircraft.

According to still another aspect of the invention, a signal representative of the validity of the aircraft position and terrain data is formed. If the aircraft position or terrain data is in an invalid state, the indication of reasonableness of the radio altitude signal is inhibited.

In an embodiment of the invention, signals corresponding to the geometric altitude of an aircraft relative to sea level and the location of the aircraft are generated responsive to data from a Global Position System receiver. A terrain clearance signal is formed from the difference between the geometric altitude and data of the height of the underlying terrain in a terrain database. A processor checks whether flight path data, terrain data and vertical and horizontal data are valid. The aircraft's radio altitude signal is compared to the terrain clearance signal and an indication of unreasonableness of the radio altitude signal is issued when the terrain clearance less the radio altitude is larger than a first predetermined amount. The indication of unreasonableness is inhibited when the aircraft is below a preset altitude or when any one of the terrain database data, latitude or longitude data, or altitude data is determined to be invalid.

The invention will be better understood from the following more detailed description taken together with the accompanying drawings and the claims.

DETAILED DESCRIPTION

Figure 2:
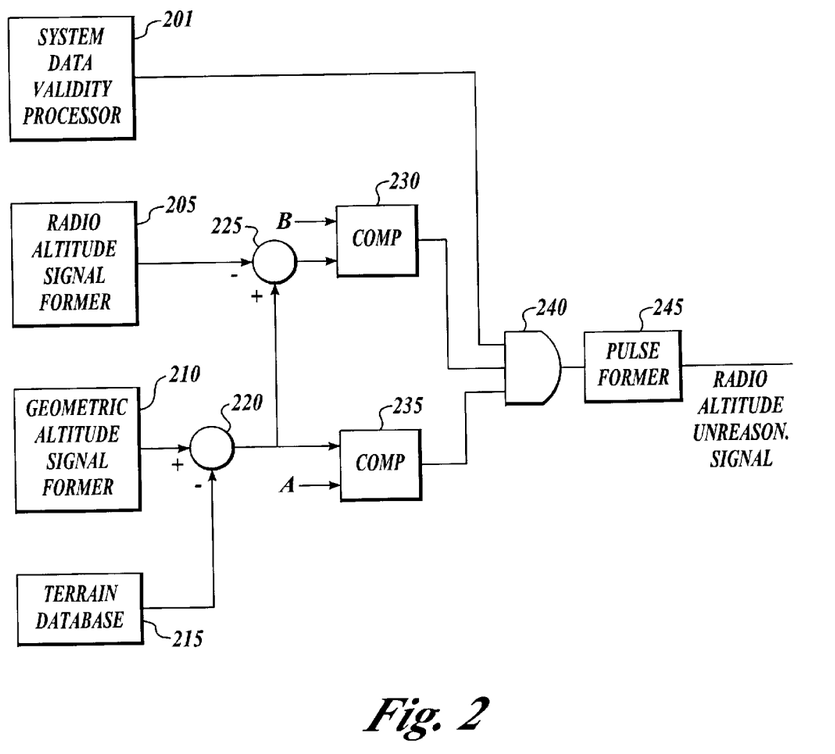
FIG. 2 is a block diagram depicting an arrangement for determining the reasonableness state of an aircraft radio altimeter reading illustrative of the invention.

FIG. 2 shows a block diagram of a system that determines the reasonableness of a radio altimeter value for use in a GPWS system so that nuisance alarms are avoided under prescribed flight conditions. In FIG. 2, there is shown a system data validity processor 201, a radio altimeter signal former 205, a geometric altimeter signal former 210, a terrain database 215, arithmetic circuits 220 and 225, comparators 230 and 235, an AND gate 240 and a pulse former 245. The outputs of the system data validity processor 201 and the outputs of the comparator 235 and the comparator 230 are coupled to inputs of the AND gate 240 and the output of the AND gate 240 is connected to the input of the pulse former 245. The outputs of the geometric altitude signal former 210 and the terrain database 215 are coupled to inputs of arithmetic circuit 220 and the output of the radio altimeter signal former 205 and the output of the arithmetic circuit 220 are coupled to inputs of the arithmetic circuit 225. A preset signal A and the output of the arithmetic circuit 220 are connected to inputs of the comparator 235 and a preset signal B and the output of the arithmetic circuit 225 are connected to inputs of the comparator 230.

In operation, the system data validity processor 201 receives information as to the validity of indicator signals used. These indicator signals are obtained from aircraft instruments, from a global positioning system (GPS) receiver and other receivers on the aircraft. The indicator signals indicate the validity of data in the terrain database 215, latitude data and longitude data from the GPS, and altitude data from a source such as the GPS. The validity processor 201 operates according to the flow chart of FIG. 3 and produces an output that inhibits radio altitude reasonableness checking in response to detection of an invalid state of any of the indicator signals applied to the system data validity processor 201.

Figure 3:
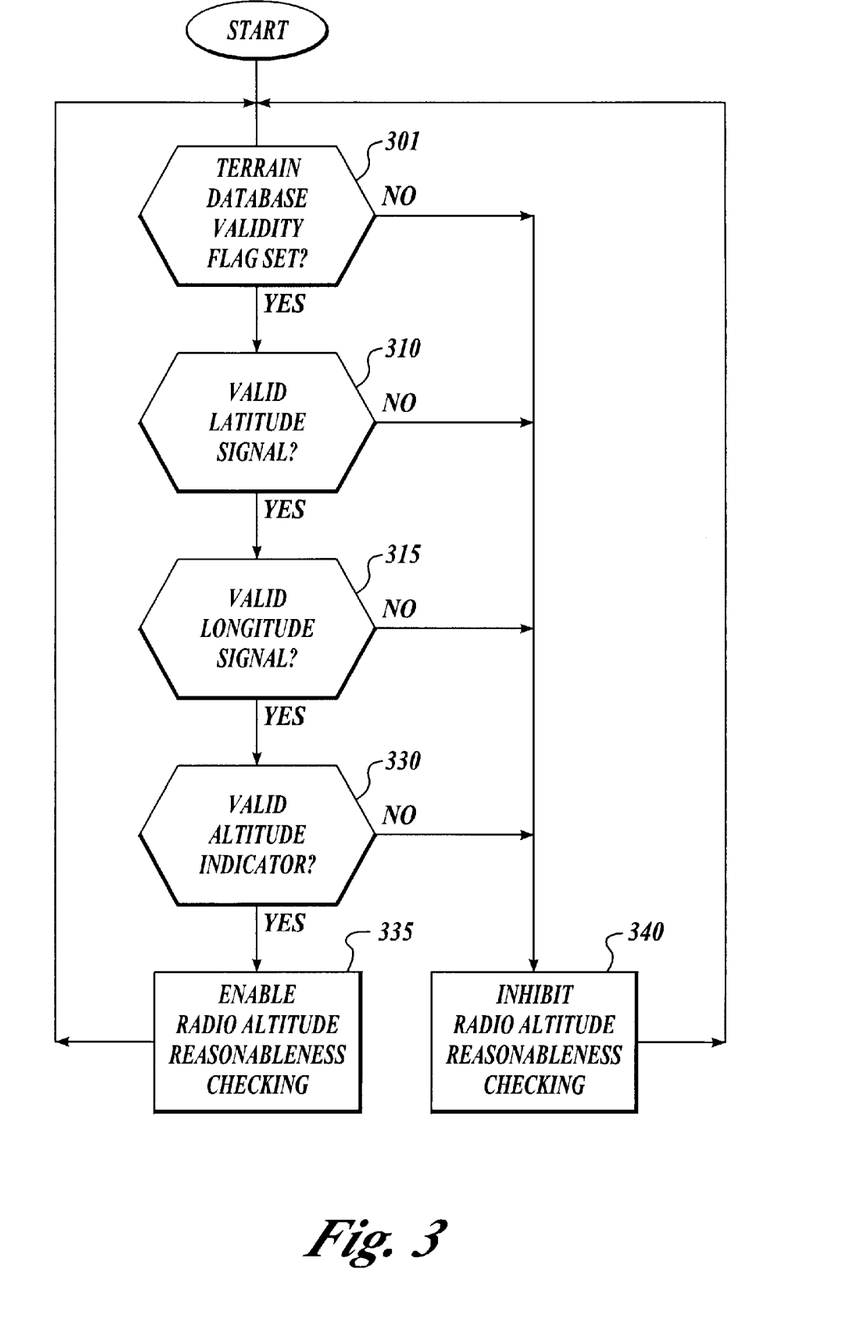
FIG. 3 is a flow chart illustrating the operation of the system validity processor of FIG. 2.

Referring to FIG. 3, the repeated sequence of data validity checks is started in a decision step 301 in which it is determined whether a validity flag in the terrain database 215 is set. If the terrain database validity flag is set, the validity of the latitude and longitude signals from the GPS receiver of the aircraft are sequentially determined in decision steps 310 and 315. Whether the altitude indicator signals from the aircraft instruments are valid is checked in the decision step 330. Upon determining a "yes" in each of decision steps 301 through 330, the output of the system data validity processor 201 is set to provide an enabling input to the AND gate 240 to check the reasonableness of the radio altitude signal in a step 335. In the event a "no" is determined in any of the decision steps 301–330 during the validity checking sequence, a step 340 is entered in which the system data validity processor is set to a state that provides an input to the AND gate 240 for inhibiting checking the reasonableness of the radio altimeter signal. The decision step 301 is reentered from either the step 335 or the step 340 to reiterate the validity checking of the system validity processor 201.

The geometric altitude signal former 210 in FIG. 2 generates a signal representative of the altitude of the aircraft relative to sea level. Such geometric altitude data may be obtained from a GPS receiver in the aircraft. The geometric altitude data is supplied to a positive input of the arithmetic unit 220.

Figure 4A:
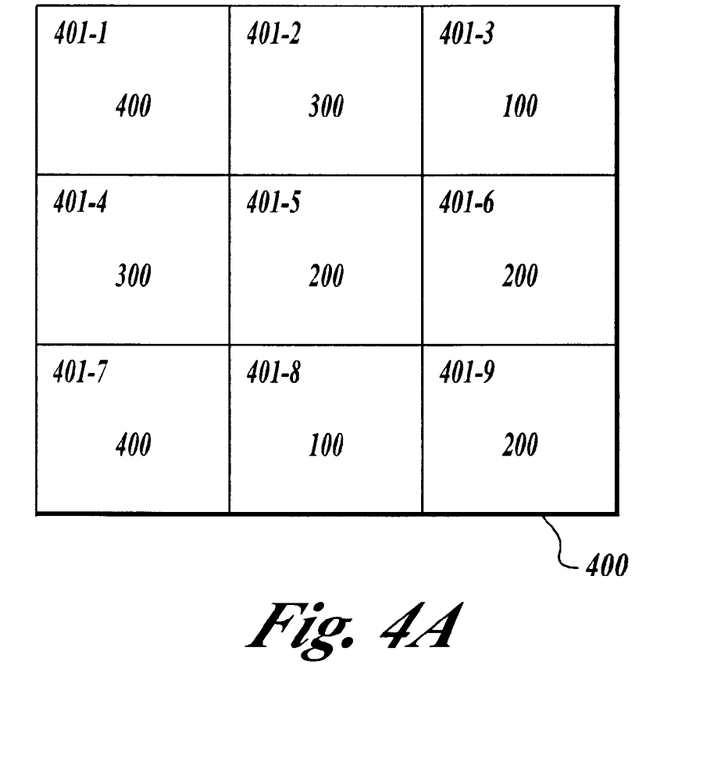
FIG. 4A shows terrain heights in blocks of the terrain along the flight path of the aircraft.
Figure 4B:
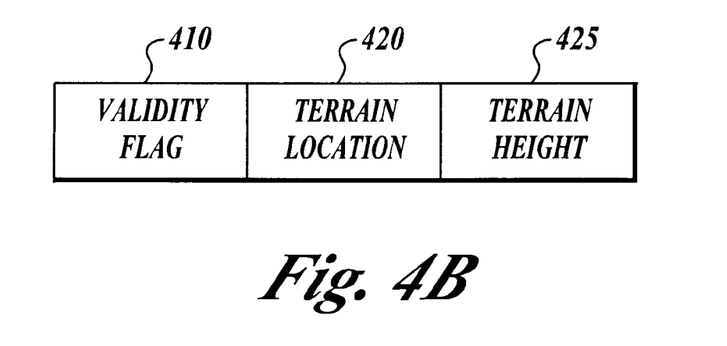
FIG. 4B depicts a database entry for the terrain blocks shown in FIG. 4A.

The terrain database 215 that supplies data to a negative input of the arithmetic unit 220 is illustrated in FIGS. 4A and 4B. FIG. 4A depicts a view of nine sections 401-1 through 401-9 of predetermined dimensions (e.g., ¼ mile by ¼ mile) of a terrain 400 underlying the flight path of the aircraft. The data in each section represents the maximum height of the terrain section. FIG. 4B illustrates an entry in the terrain database that includes a validity flag 410 and terrain section location data 420 and the terrain maximum height data 425 according to location. The maximum height of terrain section 401-5 underlying the location of the aircraft is subtracted from the geometric altitude of the aircraft in the arithmetic unit 220 and the arithmetic unit 220 forms an output signal representing the computed terrain clearance of the aircraft. The terrain clearance signal applied to arithmetic unit 225 and to the comparator 235 is independent of altitude indications of aircraft's radio or barometric altimeters.

The comparator 235 operates to compare the terrain clearance signal from the arithmetic unit 220 to a preset value A representing an altitude below which there should be no unreasonabless signal from the system of FIG. 2. The terrain clearance signal corresponds to a pseudo radio altitude generated independently of the radio altimeter. In the event that the terrain clearance signal is less than the preset value A, the pseudo radio altitude of aircraft is in a range wherein the system of FIG. 2 should not be activated and the output of the comparator 220 inhibits the AND gate 240.

The terrain clearance signal is also applied to the arithmetic unit 225 which compares the terrain clearance signal representing the pseudo radio altitude with the aircraft's radio altitude signal. The arithmetic unit 225 operates to provide an enabling signal to the AND gate 240 when the terrain clearance signal less the radio altitude signal obtained from the aircraft radio altimeter 205 is larger than a preset value B. Accordingly, the AND gate 240 is placed in its ON state when the output of the arithmetic unit 225 is larger than the preset value B provided that the terrain clearance signal is greater than the preset value A and the system data validity processor is in its enabling state. When enabled, the AND gate 240 triggers the pulse former 245. In response to the ON state output of the AND gate 240, the pulse former 245 (e.g., a one shot circuit) outputs a single pulse of predetermined duration. In this way, pseudo radio altitude value of the terrain clearance signal cross checks the aircraft radio altitude signal to inhibit a false GPWS alert. If there is an occurrence of a condition in which pseudo altitude and the aircraft's radio altitude indication are sufficiently different when the system data is valid and the aircraft is above a predetermined altitude, the GPWS is inhibited for the predetermined period.

Figure 5:
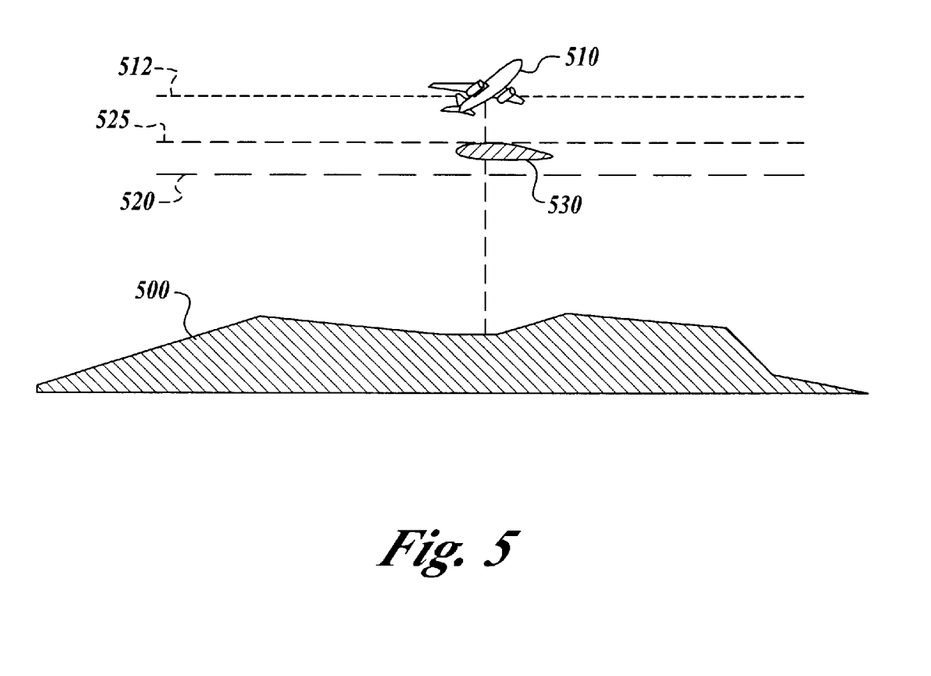
FIG. 5 illustrates the operation of the arrangement of FIG. 2.

The operation of the system shown in FIG. 2 is illustrated in FIG. 5 wherein an aircraft 510 flies over a terrain 500 at an altitude represented by a dotted line 512. A line 520 represents a preset altitude A (e.g., 4000 feet) below which the operation of the system of FIG. 2 is inhibited and a line 525 represents the upper edge of a heavy rain area 530. Assume that the pseudo radio altitude of the terrain clearance signal is between the altitude 512 and the line 525 and that the area 530 causes the aircraft radio altitude signal to indicate the distance between the lines 520 and 525 (e.g., 500 feet) as the aircraft's altitude. The output of the comparator 230 in FIG. 2 then provides an enabling input to the AND gate 240. If the output of the system data validity processor 201 is enabling, the terrain clearance signal less the aircraft radio altitude signal from arithmetic unit 225 being greater than 2000 feet enables the AND gate 240. The pulse former 245 then generates a single pulse for a preset GPWS inhibit period (e.g., 60 seconds). During this preset inhibit period, a radio altitude unreasonableness signal is applied to prevent a GPWS alert. Absent the heavy rain area 530, the difference between the radio altitude signal (line 512) and the terrain clearance (between lines 512 and 525) is less than the preset value A (2000 feet). Consequently, no pulse is generated by the pulse former 245 to inhibit GPWS.

Figure 6:
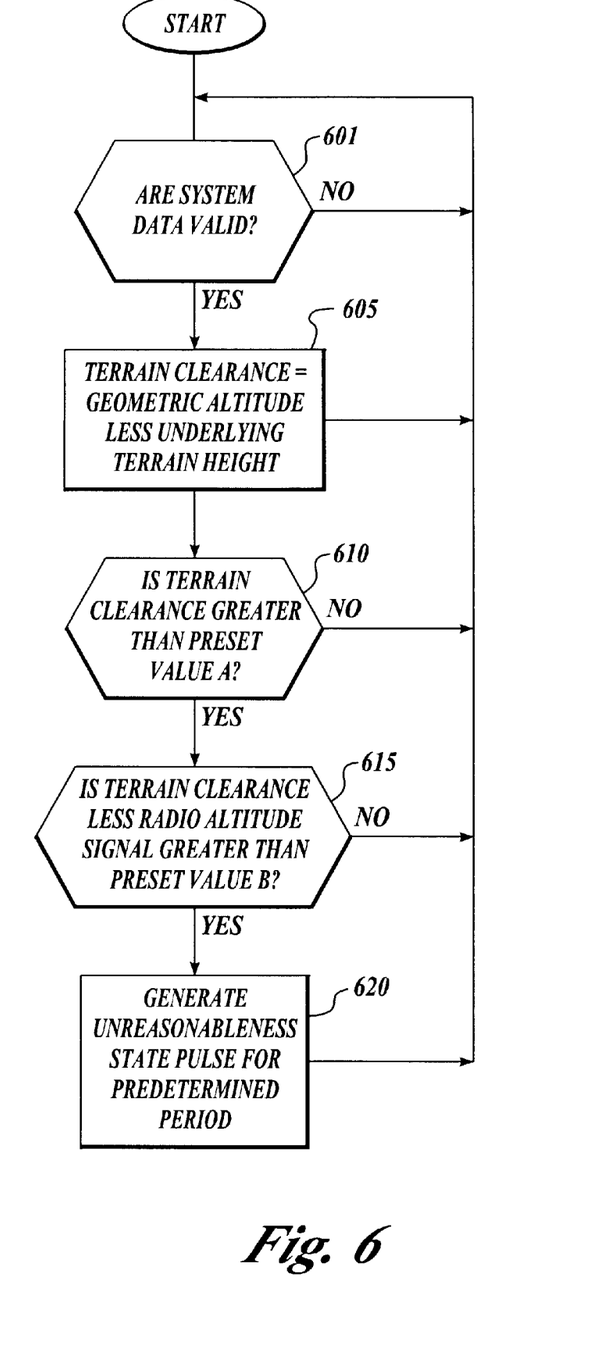
FIG. 6 is a flow chart illustrating the operation of an alternative processor arrangement for determining the reasonableness state of an aircraft radio altimeter altitude indication illustrative of the invention.

A signal processor unit under control of a program stored in a memory may be used instead of the arrangement of arithmetic units 220 and 225, comparators 230 and 235, AND gate 240 and pulse former 245 to perform the reasonableness processing function. FIG. 6 shows a flow chart illustrating the operation of a processor arrangement that may be substituted for the circuit of FIG. 2 in determining the reasonableness of a radio altimeter altitude indication for a GPWS system. In FIG. 6, it is determined in decision step 601 whether system data checked by system validity processing shown in FIG. 3 is valid. If yes, the terrain clearance signal is formed in step 605 by subtracting the terrain height signal of the terrain underlying the aircraft in the terrain database of FIG. 4A from the geometric altitude signal formed in a GPS receiver. If no in step 601, decision box 601 is reentered.

Whether the terrain clearance is greater than the preset value A (e.g., 4000 feet) is checked in decision step 610. If yes in the step 610, whether the terrain clearance signal less the aircraft's radio altitude signal is greater than the preset value B (e.g., 2000 feet) is determined in the step 615. If no in the step 610, the step 601 is reentered. When the difference between the pseudo altitude of the terrain clearance and the aircraft's radio altitude is greater than B, an unreasonableness pulse is generated for a predetermined period in step 620 and the step 601 is reentered from the step 620. If the difference between the pseudo altitude and the aircraft's radio altitude is less than B in the step 615, the step 601 is reentered from the step 615.

While the invention has been described by way of particular illustrative embodiments, it is to be understood that the invention is not limited to the above-described embodiments but that various changes and modifications may be made by those of ordinary skill in the art without departing from the scope and spirit of the invention. Accordingly, the foregoing embodiments should not be construed as limiting the scope of the invention which is encompassed instead by the following claims.

What is claimed is:

1. Apparatus for ground proximity warning of an aircraft, comprising:

radio altimeter means for generating a radio altitude signal for the aircraft;

GPS means for generating a signal separate from the radio altitude signal representative of a clearance of the aircraft from the terrain underlying the aircraft; and means responsive to the radio altitude signal and the terrain clearance signal for issuing a signal indicating a state of reasonableness of the radio altitude signal.

2. Apparatus for ground proximity warning of an aircraft according to claim 1, wherein the reasonableness state indication issuing means comprises means for comparing the terrain clearance signal with the aircraft radio altitude signal.

3. Apparatus for ground proximity warning of an aircraft according to claim 2, wherein the terrain clearance and aircraft radio altitude signal comparing means includes means responsive to the terrain clearance signal less the radio altitude signal being larger than a predetermined value for generating an indication of an unreasonableness state of the radio altitude signal.

4. Apparatus for ground proximity warning of an aircraft according to claim 1, wherein the radio altitude reasonableness state indication issuing means comprises means responsive to the terrain clearance signal being less than a predetermined value for inhibiting issuance of a radio altitude signal unreasonableness state indication.

5. Apparatus for ground proximity warning of an aircraft according to claim 1, wherein the terrain clearance signal generating means comprises:

means for generating a signal representative of a geometric altitude of the aircraft;

means for generating a signal representative of a height of the underlying terrain; and means responsive to a difference between the geometric altitude signal and the terrain height signal for generating the terrain clearance signal.

6. Apparatus for ground proximity warning of an aircraft according to claim 5, wherein the means for generating the terrain height signal comprises a terrain database including signals representative of the maximum heights of sections of the terrain underlying a flight path of the aircraft.

7. Apparatus for ground proximity warning of an aircraft according to claim 5, wherein the geometric altitude generating means includes means for generating a signal representative of the altitude of the aircraft relative to sea level.

8. Apparatus for ground proximity warning of an aircraft according to claim 1, further comprising means for determining validity of aircraft position data and aircraft underlying terrain data, wherein the radio altitude reasonableness state indication issuing means is responsive to the aircraft position data or the aircraft underlying terrain data being determined invalid for inhibiting issuance of an indication of an unreasonableness state of the radio altitude signal.

9. Apparatus for ground proximity warning of an aircraft according to claim 1, wherein the reasonableness state indication issuing means comprises means responsive to the terrain clearance signal less the radio altitude signal being larger than a predetermined value for issuing a signal indicating a unreasonableness state of the radio altitude signal, wherein issuance of the indication of an unreasonableness state of the radio altitude signal is inhibited when the terrain clearance signal is less than a predetermined value, and further comprising means for determining validity of aircraft position data and aircraft underlying terrain data, the radio altitude reasonableness state indication issuing means being responsive to determination of invalidity of the aircraft position data or aircraft underlying terrain data signal to inhibit issuance of an indication of an unreasonableness state of the radio altitude signal.

10. A ground proximity warning method for an aircraft, comprising the steps of:
   generating a radio altitude signal of the aircraft;
   generating a signal separate from the radio altitude signal representative of a clearance of the aircraft from the terrain underlying the aircraft, wherein the terrain clearance signal is generated responsive to Global Positioning System signals;
   issuing a signal indicating a state of reasonableness of the radio altitude signal responsive to the radio altitude signal and the terrain clearance signal.

11. A ground proximity warning method for an aircraft according to claim 10, wherein the reasonableness state indication issuing step comprises comparing the terrain clearance signal with the aircraft radio altitude signal.

12. A ground proximity warning method for an aircraft according to claim 11, wherein the terrain clearance and aircraft radio altitude signal comparing step includes indicating an unreasonableness of the radio altitude signal responsive to the terrain clearance signal less the radio altitude signal being larger than a predetermined value.

13. A ground proximity warning method for an aircraft according to claim 10, wherein the radio altitude reasonableness state indication issuing step comprises inhibiting issuance of a radio altitude signal unreasonableness state indication responsive to the terrain clearance signal being less than a predetermined value.

14. A ground proximity warning method for an aircraft according to claim 10, wherein the terrain clearance signal generating step comprises the steps of:
   generating a signal representative of a geometric altitude of the aircraft;
   generating a signal representative of a height of the underlying terrain; and
   generating the terrain clearance signal responsive to a difference between the geometric altitude signal and the terrain height signal.

15. A ground proximity warning method for an aircraft according to claim 14, wherein the terrain height signal is generated from a terrain database including signals representative of the maximum heights of sections of the terrain underlying a flight path of the aircraft.

16. A ground proximity warning method for an aircraft according to claim 14, wherein the geometric altitude generating step includes generating a signal representative of the altitude of the aircraft relative to sea level.

17. A ground proximity warning method for an aircraft according to claim 10, further comprising the step of determining validity of aircraft position data and aircraft underlying terrain data, wherein issuance of an indication of an unreasonableness state of the radio altitude signal is inhibited responsive to the aircraft position data or the aircraft underlying terrain data being determined invalid.

18. A ground proximity warning method for an aircraft according to claim 10,
   wherein the reasonableness state indication issuing step comprises issuing a signal indicating an unreasonableness state of the radio altitude signal responsive to the terrain clearance signal less the radio altitude signal being larger than a predetermined value,
   wherein issuance of the indication of an unreasonableness state of the radio altitude signal is inhibited when the terrain clearance signal is less than a predetermined value, and
   further comprising determining validity of aircraft position data and aircraft underlying terrain data, the radio altitude reasonableness state indication issuing being responsive to determination of invalidity of the aircraft position data or the aircraft underlying terrain data to inhibit issuance of an indication of an unreasonableness state of the radio altitude signal.

19. In a ground proximity warning system for an aircraft having a radio altimeter for generating radio altitude signals, a computer usable medium having computer readable program code units embodied therein comprising:
   a first program code unit for generating a signal separate from the radio altitude signal representative of a clearance of the aircraft from terrain underlying the aircraft, wherein the terrain clearance signal is generated responsive to Global Positioning System signals; and
   a second program code unit for issuing a signal indicating a state of reasonableness of the radio altitude signal responsive to the radio altitude signal and the terrain clearance signal.

20. In a ground proximity warning system for an aircraft having a radio altimeter for generating radio altitude signals, a computer usable medium having computer readable program code units embodied therein according to claim 19, wherein the second program code unit comprises a third program code unit for comparing the terrain clearance signal with the aircraft radio altitude signal.

21. In a ground proximity warning system for an aircraft having a radio altimeter for generating radio altitude signals, a computer usable medium having computer readable program code units embodied therein according to claim 20, wherein the third program code unit includes a fourth program code unit for issuing an indication of unreasonableness of the radio altitude signal responsive to the terrain clearance signal less the radio altitude signal being larger than a predetermined value.

22. In a ground proximity warning system for an aircraft having a radio altimeter for generating radio altitude signals, a computer usable medium having computer readable program code units embodied therein according to claim 19, wherein the second program code unit comprises a fifth program code unit for inhibiting issuance of a radio altitude signal unreasonableness state indication responsive to the terrain clearance signal being less than a predetermined value.

23. In a ground proximity warning system for an aircraft having a radio altimeter for generating radio altitude signals, a computer usable medium having computer readable program code units embodied therein according to claim 19, wherein first program code unit comprises:
   a sixth program code unit for generating a signal representative of a geometric altitude of the aircraft;
   a seventh program code unit for generating a signal representative of a height of the underlying terrain; and
   an eighth program code unit for generating the terrain clearance signal responsive to a difference between the geometric altitude signal and the terrain height signal.

24. In a ground proximity warning system for an aircraft having a radio altimeter for generating radio altitude signals, a computer usable medium having computer readable program code units embodied therein according to claim 23, wherein the terrain height signal is generated from a terrain database including signals representative of the maximum heights of sections of the terrain underlying a flight path of the aircraft.

25. In a ground proximity warning system for an aircraft having a radio altimeter for generating radio altitude signals, a computer usable medium having computer readable program code units embodied therein according to claim 23, wherein the sixth program code generates a signal representative of the altitude of the aircraft relative to sea level.

26. In a ground proximity warning system for an aircraft having a radio altimeter for generating radio altitude signals, a computer usable medium having computer readable program code units embodied therein according to claim 19, further comprising a ninth program code unit for determining validity of aircraft position data and aircraft underlying terrain data, wherein issuance of an indication of an unreasonableness state of the radio altitude signal is inhibited responsive to the aircraft position data or the aircraft underlying terrain data being determined invalid.

27. In a ground proximity warning system for an aircraft having a radio altimeter for generating radio altitude signals, a computer usable medium having computer readable program code units embodied therein according to claim 19, wherein the second program code unit comprises a tenth program code unit for issuing a signal indicating an unreasonableness state of the radio altitude signal responsive to the terrain clearance signal less the radio altitude signal being larger than a predetermined value, wherein issuance of the indication of an unreasonableness state of the radio altitude signal is inhibited when the terrain clearance signal is less than a predetermined value, and further comprising an eleventh program code unit for determining validity of aircraft position data and aircraft underlying terrain data, the radio altitude reasonableness state indication issuing of the second program code unit being responsive to a determination of invalidity of the aircraft position data or aircraft underlying terrain data signal by the program code unit to inhibit issuance of an indication of an unreasonableness state of the radio altitude.

28. Apparatus for ground proximity warning of an aircraft, comprising:

a radio altimeter for generating a radio altitude signal for the aircraft;

terrain clearance signal generator for generating a signal separate from the radio altitude signal representative of a clearance of the aircraft from the terrain underlying the aircraft, wherein the terrain clearance signal is generated responsive to Global Positioning System signals; and a radio altitude reasonableness state signal generator responsive to the radio altitude signal and the terrain clearance signal for issuing a signal indicating a state of reasonableness of the radio altitude signal.

29. Apparatus for ground proximity warning of an aircraft according to claim 28, wherein the radio altitude reasonableness state signal generator comprises a comparator for comparing the terrain clearance signal with the aircraft radio altitude signal.

30. Apparatus for ground proximity warning of an aircraft according to claim 29, wherein the terrain clearance and aircraft radio altitude signal comparator includes a unit responsive to the terrain clearance signal less the radio altitude signal being larger than a predetermined value.

31. Apparatus for ground proximity warning of an aircraft according to claim 28, wherein the radio altitude reasonableness state signal generator comprises a unit responsive to the terrain clearance signal being less than a predetermined value for inhibiting issuance of an unreasonableness state signal.

32. Apparatus for ground proximity warning of an aircraft according to claim 28, wherein the terrain clearance signal generator comprises:

a geometric altitude signal former for generating a signal representative of a geometric altitude of the aircraft;

a terrain height signal generator for generating a signal representative of a height of the underlying terrain; and an arithmetic unit responsive to a difference between the geometric altitude signal and the terrain height signal for generating the terrain clearance signal.

33. Apparatus for ground proximity warning of an aircraft according to claim 32, wherein the terrain height signal generator comprises a terrain database including data representative of the maximum heights of sections of the terrain underlying a flight path of the aircraft.

34. Apparatus for ground proximity warning of an aircraft according to claim 32, wherein the geometric altitude former includes an altitude signal generator for generating a signal representative of the altitude of the aircraft relative to sea level.

35. Apparatus for ground proximity warning of an aircraft according to claim 1, further comprising a data validity processor for determining validity of aircraft position data and aircraft underlying terrain data, wherein the radio altitude reasonableness state generator is responsive to the aircraft position data or the aircraft underlying terrain data being determined invalid for inhibiting issuance of an indication of an unreasonableness state of the radio altitude signal.

36. Apparatus for ground proximity warning of an aircraft according to claim 28, wherein the radio altitude reasonableness state signal generator comprises a comparator responsive to the terrain clearance signal less the radio altitude signal being larger than a predetermined value for issuing a signal indicating an unreasonableness state of the radio altitude signal, wherein issuance of the indication of an unreasonableness state of the radio altitude signal is inhibited when the terrain clearance signal is less than a predetermined value, and further comprising a data validity processor for determining validity of aircraft position data and aircraft underlying terrain data, the radio altitude reasonableness state signal generator being responsive to a determination of invalidity of the aircraft position data or aircraft underlying terrain data signal to inhibit issuance of an indication of an unreasonableness state of the radio altitude signal.

\* \* \* \* \*